(12) United States Patent
Zhou et al.

(10) Patent No.: US 8,773,991 B2
(45) Date of Patent: Jul. 8, 2014

(54) BANDWIDTH CONTROL METHOD

(75) Inventors: Zhedng-Bo Zhou, Jiangsu (CN); Ruo-Yu Cao, Jiangsu (CN)

(73) Assignee: Sernet (Suzhou) Technologies Corporation, Jiangsu (CN)

( * ) Notice: Subject to any disclaimer, the term of this patent is extended or adjusted under 35 U.S.C. 154(b) by 95 days.

(21) Appl. No.: 13/553,000

(22) Filed: Jul. 19, 2012

(65) Prior Publication Data
US 2013/0039175 A1    Feb. 14, 2013

(30) Foreign Application Priority Data
Aug. 11, 2011  (CN) .......................... 2011 1 0229695

(51) Int. Cl.
H04L 12/26 (2006.01)
H04L 12/28 (2006.01)
H04L 12/56 (2006.01)

(52) U.S. Cl.
CPC ............ *H04L 47/40* (2013.01); *H04L 47/263* (2013.01)
USPC ......................................................... 370/230

(58) Field of Classification Search
CPC ......... H04L 47/10; H04L 47/16; H04L 47/19; H04L 47/193; H04L 47/196; H04L 47/20; H04L 47/21; H04L 47/22; H04L 47/25; H04L 47/29; H04L 12/569
USPC ............ 370/229, 230, 230.1, 235, 235.1, 236
See application file for complete search history.

(56) References Cited

U.S. PATENT DOCUMENTS

| | | | | |
|---|---|---|---|---|
| 7,283,814 B2* | 10/2007 | Klein et al. | .................... | 455/419 |
| 7,978,628 B2* | 7/2011 | Bugenhagen | .................. | 370/253 |
| 8,111,714 B2* | 2/2012 | Melsen et al. | ................ | 370/468 |
| 8,295,174 B2* | 10/2012 | Wu et al. | ....................... | 370/233 |
| 8,488,461 B2* | 7/2013 | Pan et al. | ....................... | 370/232 |
| 2008/0089250 A1* | 4/2008 | Jung | .............................. | 370/276 |

* cited by examiner

*Primary Examiner* — Mark Rinehart
*Assistant Examiner* — Kenneth P Hunt
(74) *Attorney, Agent, or Firm* — McClure, Qualey & Rodack, LLP

(57) ABSTRACT

A bandwidth control method is provided. A router is provided to establish a network connection to a remote apparatus. The remote apparatus is allocated with a downlink bandwidth for servicing the gateway. A plurality of downlink packets are received by the gateway. In response to reception of the downlink packets, the gateway transmits a plurality of uplink packets to the remote apparatus to allow the remote apparatus to transmit more downlink packets to the gateway after the remote apparatus acknowledges reception of the uplink packets. A transmission rate of the uplink packets is limited within an uplink threshold by the gateway so that a transmission rate of the downlink packets is smaller than the downlink bandwidth allocated to the remote apparatus. The uplink threshold is determined based on the downlink bandwidth.

17 Claims, 2 Drawing Sheets

BANDWIDTH CONTROL METHOD

This application claims the benefit of People's Republic of China application Serial No. 201110229695.7, filed Aug. 11, 2011, the subject matter of which is incorporated herein by reference.

BACKGROUND

1. Technical Field

The application relates in general to a bandwidth control method, and more particularly to a bandwidth control method for a network device.

2. Description of the Related Art

A gateway, also referred to as a router, is a network device frequently utilized in home network or office network for providing network resources shared by client devices connected to the gateway.

For access point devices, a quality of service (QoS) is critical. Under the circumstances, a gateway usually needs to reserve network resources for the access point device. For example, for uplink packets, a gateway reserves some uplink bandwidth for the access point device through a priority algorithm.

However, for downlink data, a bottleneck is usually at a central office, e.g., a telecommunication service provider, and so QoS of downlink packets is generally implemented at devices of the central office. For example, if downlink packets from a central office to a customer-premise equipment compete each other, it is possible that packets are loss due to an excessively high transmission rate. As a result, the QoS of downlink packets is conventionally not guaranteed by the gateway, but relies on the central office. User can neither change nor control devices of the central office. Therefore, the QoS of devices at the central office is faced with implementation inconveniences.

SUMMARY OF THE APPLICATION

The application is directed to a bandwidth control method for ensuring a quality of service (QoS) of downlink packets at a customer-premise equipment.

According to an example of the present application, a bandwidth control method is provided. A router is provided to establish a network connection to a remote apparatus. The remote apparatus is allocated with a downlink bandwidth for servicing the gateway. A plurality of downlink packets are received by the gateway. In response to reception of the downlink packets, the gateway transmits a plurality of uplink packets to the remote apparatus to allow the remote apparatus to transmit more downlink packets to the gateway after the remote apparatus acknowledges reception of the uplink packets. A transmission rate of the uplink packets is limited within an uplink threshold by the gateway so that a transmission rate of the downlink packets is smaller than the downlink bandwidth allocated to the remote apparatus. The uplink threshold is determined based on the downlink bandwidth.

The above and other contents of the application will become better understood with regard to the following detailed description of the preferred but non-limiting embodiments. The following description is made with reference to the accompanying drawings.

DETAILED DESCRIPTION OF EMBODIMENTS OF THE APPLICATION

Some elements of the embodiments are omitted in the diagrams to demonstrate technical characteristics of the present application.

In a bandwidth control method according to embodiments of the present application, by controlling a transmission rate of uplink packets, a transmission rate of downlink packets is controlled within a predetermined bandwidth. Accordingly, possibility of packet loss due to too high downlink packet transmission rate is reduced to ensure quality of service (QoS). In other words, a bottleneck of a downlink bandwidth is relocated to a customer-premise equipment, e.g., a gateway, so that the customer-premise equipment guarantees QoS and enhances utilization conveniences.

Figure 1:
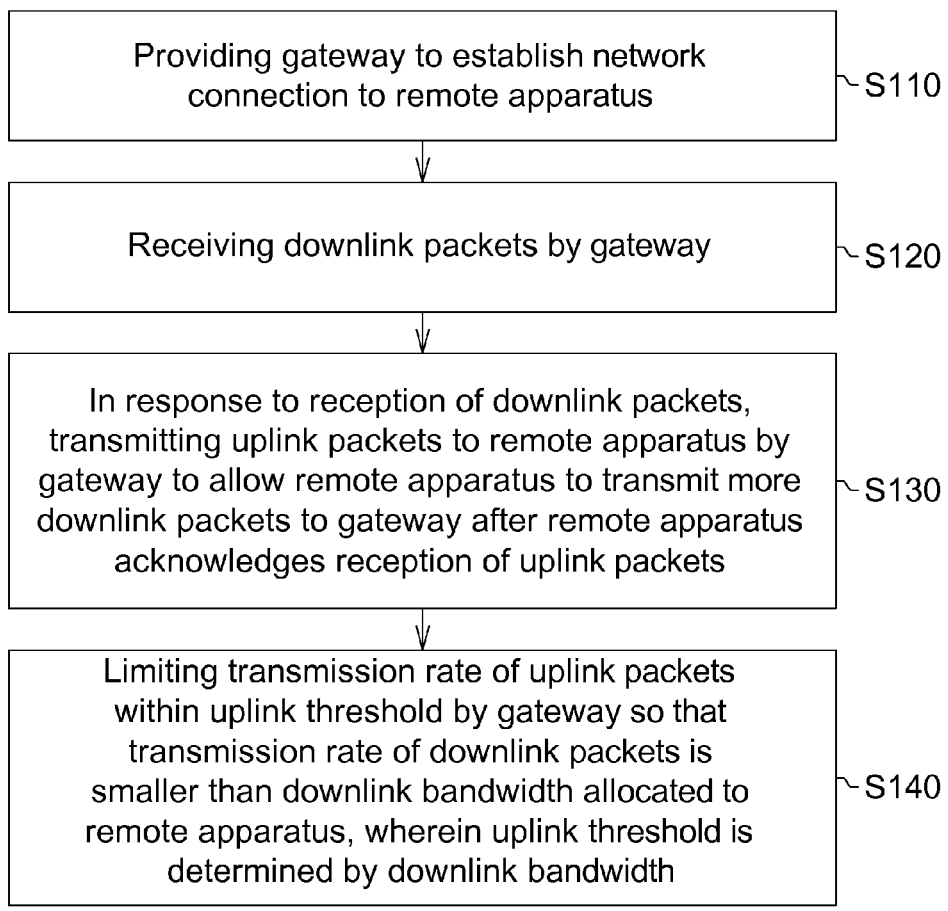
FIG. 1 is a flowchart of a bandwidth control method according to one embodiment of the present application.
Figure 2:
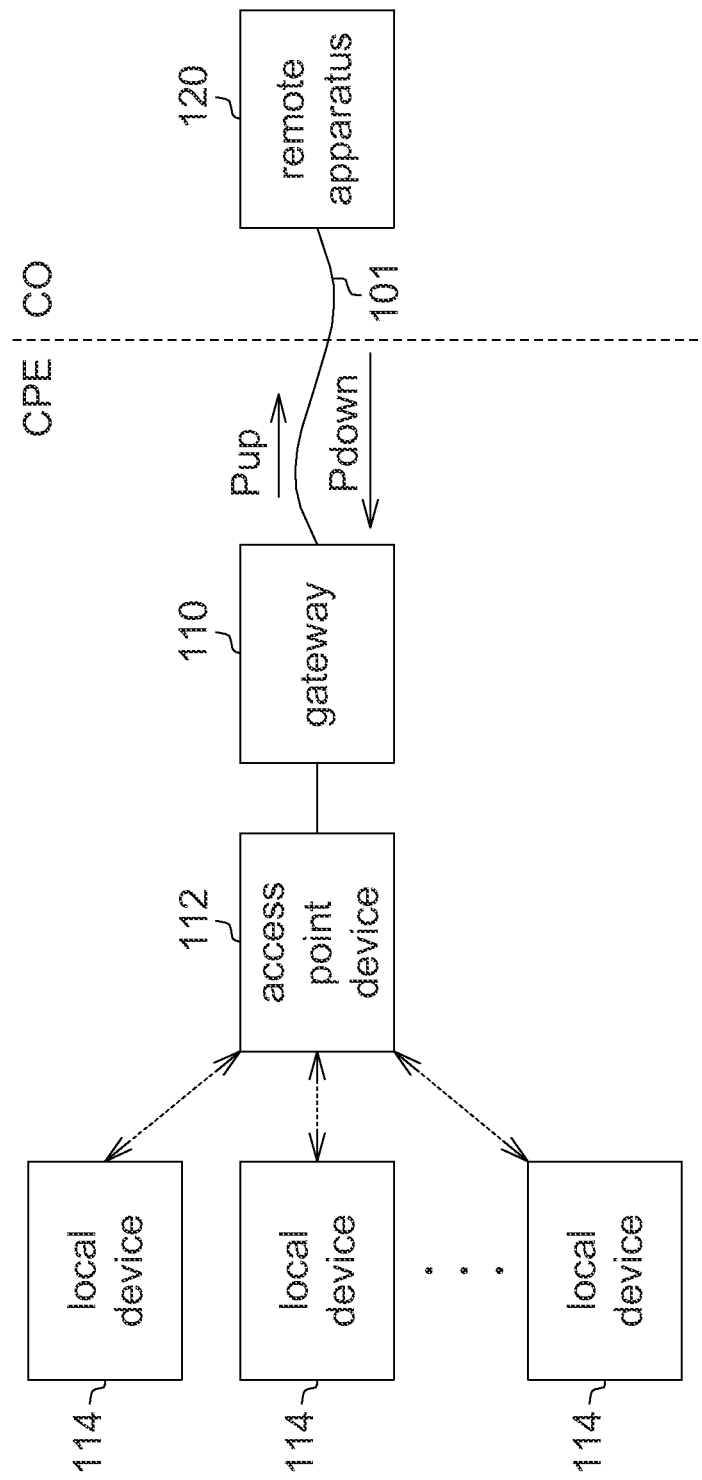
FIG. 2 is a schematic diagram of a network system according to one embodiment of the present application.

FIG. 1 shows a flowchart of a bandwidth control method according to one embodiment of the present application. FIG. 2 shows a schematic diagram of a network system according to the embodiment of the present application. The bandwidth control method according to the embodiment of the present application shall be described below with reference to the network system in FIG. 2.

Referring to FIG. 2, a network system 10 includes a customer-premise equipment CPE and a central office CO. For example, the customer-premise equipment CPE is an individual or business user, and the central office CO is a telecommunication service provider or a telecommunication company. Through a transmission medium 101, the customer-premise equipment CPE and the central office CO communicate with each other to exchange packets or data. In this embodiment, an uplink packet Pup represents a packet from the customer-premise equipment CPE to the central office CO, and the uplink packet Pup includes a uplink data packet and a uplink acknowledgement packet. A downlink packet Pdown represents a packet from the central office CO to the customer-premise equipment CPE and the downlink packet Pdown includes a downlink data packet and a downlink acknowledgement packet.

In Step S110, a gateway 110 is provided. The gateway 110 establishes a network connection to a remote apparatus 120.

For example, the gateway 110 is a home gateway providing various functions, including a gateway function for a home network and an external network (e.g., a CPE network and a CO network), a firewall function, or a routing function for at least two customer-premise equipments CPE connecting to each other. In one embodiment, for example, the gateway 110 is a router, a modem or other gateway devices.

The gateway 110 is connected to an access point device 112. For example, the access point device 112 is connected to local devices 114 via a communication connection compliant to a communication protocol to provide various services, e.g., audio (phone) services, internet data services or video services. For example, the access point device 112 may be a wireless network access point device, e.g., a femtocell, or other access point devices capable of providing multiple services. For example, the local device 114 includes a mobile phone, a personal digital assistant (PDA), a computer, or other user equipments. In an alternative embodiment, the gateway 110 may also be directly connected to at least one of the local devices 114.

The gateway 110 is also connected to the remote apparatus 120. When the gateway 110 establishes the network connection and connects to the remote apparatus 120, the gateway 110 is allowed to obtain network services from the remote apparatus 120, e.g., downloading or uploading packets.

The remote apparatus 120 allocates a downlink bandwidth for servicing the gateway 110. For example, the remote apparatus 120 includes a switch, a network service device or other equipments provided by the network or the telecommunication service provider. The downlink bandwidth allocated by the remote apparatus 120 represents a maximum bandwidth that the remote apparatus 120 is allowed for transmitting the downlink packet Pdown. To prevent packet loss, the transmission rate of the downlink packet Pdown is limited by the maximum bandwidth.

In Step S120, the gateway 110 receives a plurality of downlink packets Pdown. For example, the gateway 110 transmits a request signal or a request packet to the remote apparatus 120, and starts downloading packets after acknowledged by the remote apparatus 120. Alternatively, packets are transmitted to the gateway 110 after the remote apparatus 120 receives the request signal or the request packet.

In Step S130, in response to reception of the downlink packets, the gateway 110 transmits a plurality of uplink packets Pup to the remote apparatus 120, so as to allow the remote apparatus 120 to transmit more downlink packets to the gateway 110 after the remote apparatus 120 acknowledges the uplink packets Pup are received. In one embodiment, the uplink packet Pup is a transmission control protocol (TCP) acknowledgement packet. In another embodiment, the uplink packet Pup is a user data protocol (UDP) packet. It should be noted that the uplink packet Pup is not limited to the examples above and can be compliant to other network transmission layer protocols.

In Step S140, the gateway 110 limits the transmission rate of the uplink packet Pup within an uplink threshold determined based on the downlink bandwidth of the remote apparatus 120, such that the transmission rate of the downlink packet Pdown is smaller than the downlink bandwidth of the remote apparatus 120.

Since applications in a network system are generally bidirectional, the transmission rate of the downlink packet Pdown is effectively controlled by limiting the transmission rate of the uplink packet Pup according to the uplink threshold. For example, for TCP service data, the TCP has congestion control. In other words, transmission of the uplink packet is related to an uplink acknowledgement packet. The transmission rate of a download packet from such as the central office gets faster as transmission of the uplink acknowledgement packet gets faster, and vice versa. For UDP service data, most application layers implement an acknowledgement mechanism similar to that of the TCP services, although the transmission layer does not implement an acknowledgement mechanism.

Therefore, by controlling the rate of the uplink packet, the transmission rate of the downlink packet is limited by the predetermined bandwidth, so that possibility of packet loss due to too high transmission rate (exceeding the limit) is reduced to further ensure QoS.

In another embodiment, the uplink threshold is determined according to an equation below:

$$RQack\_max = Rdql\_lim \times Sta/Asta;$$

where RQack_max is a uplink threshold of the gateway 110, Rdql_lim is a downlink bandwidth of the remote apparatus 120, Asta is a first predetermined value representing an average data size of a downlink packet response to a uplink packet, and Sta is a second predetermined value representing a maximum data size of the uplink acknowledgement packet of the uplink packet Pup.

In the description below, network transmission layer protocols TCP and UDP shall be given as examples for illustrating how the uplink threshold is determined.

TCP service control is described as following. A TCP acknowledgement packet usually has a small data size. From a bandwidth perspective, competition in an uplink bandwidth is usually unlikely when a large amount of data is downloaded. Thus, a conventional priority sequence queue does not take effect. To limit the transmission rate of acknowledgement packets, several approaches below may be adopted.

In one control mechanism, a queue is established for an uplink path, and all uplink packets Pup (TCP acknowledgement packets) are queued in the queue. In a practical example, almost every TCP uplink packets has an acknowledgement flag, and thus it is not easy to identify a TCP acknowledgement packet just according to the acknowledgement flag. Therefore, the predetermined value Sta is introduced, and packets having a size smaller than the predetermined value Sta are identified as real TCP acknowledgement packets and they are queued in the queue. In other words, for the uplink packets Pup in the queue, the predetermined value Sta represents a maximum data size of the uplink acknowledgement packet of the uplink packets Pup.

For example, the predetermined value Sta for the TCP services may rely on a size of the basic acknowledgement packet, or sizes of various headers including a TCP header, an Internet protocol (IP) header, and/or an Ethernet frame header. For example, the predetermined value Sta of the TCP services is 70 bytes.

In another control mechanism, by limiting a maximum flow per unit time in/out of a queue, a maximum flow per unit time of the uplink packet Pup is limited by a packet number. Alternatively, the transmission rate of the uplink packet Pup is limited by the uplink threshold, by limiting the maximum flow per unit time of the uplink packet Pup within a packet number. In one embodiment, an equation of the packet number and the uplink threshold is:

$$PRack\_max = (RQack\_max/8)/Sta;$$

where PRack_max is the packet number, and RQack_max is the uplink threshold. The uplink threshold RQack_max is in bits per second (bps), and the packet number is in packets per second (pps).

In still another control mechanism, the predetermined value Asta is introduced. The predetermined value Asta represents an average data size of the downlink packet response to the acknowledgement packet. An equation below is obtained:

$$Rdql\_lim = PRack\_max * ASta * 8$$
$$= RQack\_max * ASta/Sta$$

The equation above is deduced into:

$$RQack\_max = Rdql\_lim * Sta/ASta$$

According to the above equation, the uplink threshold RQack_max of the gateway may be obtained if the downlink bandwidth RDql_lim of the remote apparatus 120 is given.

In yet alternative control mechanism, besides the uplink path queue, another queue for other packets may be present. To ensure QoS, the queue is assigned with a corresponding priority. An equation of a downlink flow (or a downlink bandwidth) per unit time for a high-priority queue and a low-priority queue is as below:

$$Rdql < Bd\mathrm{max} - Rdqh$$

The above equation is deduced into:

$$RQack\_\mathrm{max} < (Bd\mathrm{max} - Rdqh) * Sta/ASta,$$

where Rdqh is the downlink flow per unit time into/out of the high-priority queue, Rdql is the downlink flow per unit time into/out of the low-priority queue, and Bdmax is a maximum downlink flow per unit time of the gateway 110.

A mechanism for controlling UDP services shall be described below. Since acknowledgement of UDP services is implemented at upper application layers, the gateway 110 may not identify which data packets are acknowledgement packets. Therefore, all uplink packets may be regarded as acknowledgement packets and they are queued in the uplink path queue. The uplink threshold RQack_max may be determined according to the above equations.

For example, the predetermined value Sta of UDP services may rely on packet size of a maximum network packet. The maximum network packet includes a maximum transmission unit (MTU) and various headers (including a UDP header, an IP header and/or an Ethernet frame header). In a practical example, the size of the Ethernet maximum network packet is 1514 byes and so that predetermined value Sta of UDP services may be set to 1514.

Parameter settings shall be described. For home environment, phone service has higher priority than internet services. To ensure QoS of high-priority services, a fixed bandwidth control mechanism may be adopted. For example, the downlink flow per unit time Rdqh into/out of the high-priority queue is set to equal a guaranteed downlink bandwidth of the access point device 112.

Theoretically, the predetermined value Asta is between a range of 0 and 64K. In practice, in high download rate, the predetermined value Asta is between 1.2K and 6K byes. However, an optimal value of the predetermined value Asta may be determined according to simulations, experiments, test results, or trial-and-error, or according to different network environments or user requirements. In one embodiment, the predetermined value Asta is dynamically adjustable, e.g., adjusted according to network service history information.

Further, a computer program product is provided according to another embodiment of the present application. For example, the computer program product includes a plurality of program segments. For example, the computer program product is implemented as an application program or may implement in a system program. When an electronic apparatus having buffers loads the program product, the electronic apparatus executes program commands to perform the above bandwidth control method of the above embodiments. Further, the computer program product may be implemented as a computer-readable storage medium storing at least one program or a software module. The program or software module may be regarded as an implementation for the computer program product, to implement the above bandwidth control method of the above embodiments. For example, the computer-readable data storage medium is an optical data storage medium, a magnetic data storage medium or firmware, or codes transmitted through a network and/or a transmission medium (e.g., air).

Therefore, the bandwidth control method and the computer program product disclosed by the embodiments of the present application have the following advantages. (1) A gateway is capable of guaranteeing QoS of downlink packet, (2) the downlink bandwidth is controlled by limiting the uplink rate, and (3) the possibility of packet loss due to too high transmission rate of the downlink packet is reduced.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A bandwidth control method performed by a gateway, comprising:
   establishing a network connection to a remote apparatus, the remote apparatus being allocated with a downlink bandwidth for servicing the gateway;
   receiving a plurality of downlink packets;
   in response to reception of the downlink packets, transmitting a plurality of uplink packets to the remote apparatus, so as to allow the remote apparatus to transmit more downlink packets to the gateway after the remote apparatus acknowledges reception of the uplink packets; and
   limiting a transmission rate of the uplink packets within an uplink threshold so that that a transmission rate of the downlink packets is smaller than the downlink bandwidth allocated to the remote apparatus;
   wherein, the uplink threshold is determined according to the downlink bandwidth, a first predetermined value, and a second predetermined value, the first predetermined value represents an average data size of the downlink packets which are response to the uplink packets, and the second predetermined value represents a maximum data size of an uplink acknowledgement packet of the uplink packets.

2. The method according to claim 1, wherein the first predetermined value is between 1.2K and 6K bytes.

3. The method according to claim 1, wherein the second predetermined value is 70 bytes.

4. The method according to claim 1, wherein the uplink threshold is determined by an equation:

$$RQack\_\mathrm{max} = Rdql\_lim \times Sta/Asta;$$

where RQack_max is the uplink threshold, Rdql_lim is the downlink bandwidth, Asta is the first predetermined value, and Sta is the second predetermined value.

5. The method according to claim 1, wherein, the gateway limits the transmission rate of the uplink packets within the uplink threshold by limiting a flow per unit time of the uplink packets within a packet number.

6. The method according to claim 5, wherein an equation of the packet number and the uplink threshold is:

$$PRack\_\mathrm{max} = (RQack\_\mathrm{max}/8)/Sta;$$

where PRack_max is the packet number, RQack_max is the uplink threshold, and Sta is the second predetermined value.

7. The method according to claim 1, wherein the uplink packets include user data protocol (UDP) packets.

8. A bandwidth control method performed by a gateway, comprising:
   establishing a network connection to a remote apparatus, the remote apparatus being allocated with a downlink bandwidth for servicing the gateway;
   receiving a plurality of downlink packets;
   in response to reception of the downlink packets, transmitting a plurality of uplink packets to the remote apparatus, so as to allow the remote apparatus to transmit more downlink packets to the gateway after the remote apparatus acknowledges reception of the uplink packets; and
   limiting a transmission rate of the uplink packets within an uplink threshold so that that a transmission rate of the downlink packets is smaller than the downlink bandwidth allocated to the remote apparatus;

wherein, the uplink threshold is determined by an equation:

$$RQack\_max = Rdql\_lim \times Sta/Asta;$$

where RQack_max is the uplink threshold, Rdql_lim is the downlink bandwidth, Asta is a first predetermined value representing an average data size of the downlink packets which are response to the uplink packets, and Sta is a second predetermined value representing a maximum data size of an uplink acknowledgement packet of the uplink packets.

9. The method according to claim 8, wherein, the gateway limits the transmission rate of the uplink packets within the uplink threshold by limiting a flow per unit time of the uplink packets within a packet number.

10. The method according to claim 9, wherein an equation of the packet number and the uplink threshold is:

$$PRack\_max = (RQack\_max/8)/Sta;$$

where PRack_max is the packet number.

11. The method according to claim 8, wherein the uplink packets include user data protocol (UDP) packets.

12. A bandwidth control method performed by a gateway, comprising:

establishing a network connection to a remote apparatus, the remote apparatus being allocated with a downlink bandwidth for servicing the gateway;

receiving a plurality of downlink packets;

in response to reception of the downlink packets, transmitting a plurality of uplink packets to the remote apparatus, so as to allow the remote apparatus to transmit more downlink packets to the gateway after the remote apparatus acknowledges reception of the uplink packets; and limiting a transmission rate of the uplink packets within an uplink threshold so that that a transmission rate of the downlink packets is smaller than the downlink bandwidth allocated to the remote apparatus;

wherein, the uplink threshold is determined according to the downlink bandwidth;

the gateway limits the transmission rate of the uplink packets within the uplink threshold by limiting a flow per unit time of the uplink packets within a packet number; and an equation of the packet number and the uplink threshold is:

$$PRack\_max = (RQack\_max/8)/Sta;$$

where PRack_max is the packet number, RQack_max is the uplink threshold, and Sta is a second predetermined value representing a maximum data size of an uplink acknowledgement packet of the uplink packets.

13. The method according to claim 12, wherein the uplink threshold is determined further according to a first predetermined value representing an average data size of the downlink packets which are response to the uplink packets.

14. The method according to claim 12, wherein the uplink packets include user data protocol (UDP) packets.

15. A bandwidth control method performed by a gateway, comprising:

establishing a network connection to a remote apparatus, the remote apparatus being allocated with a downlink bandwidth for servicing the gateway;

receiving a plurality of downlink packets;

in response to reception of the downlink packets, transmitting a plurality of uplink packets to the remote apparatus, so as to allow the remote apparatus to transmit more downlink packets to the gateway after the remote apparatus acknowledges reception of the uplink packets; and limiting a transmission rate of the uplink packets within an uplink threshold so that that a transmission rate of the downlink packets is smaller than the downlink bandwidth allocated to the remote apparatus;

wherein, the uplink threshold is determined according to the downlink bandwidth, and the uplink packets include user data protocol (UDP) packets, wherein an equation of the packet number and the uplink threshold is:

$$PRack\_max = (RQack\_max/8)/Sta;$$

where PRack_max is the packet number, RQack_max is the uplink threshold, and Sta is a second predetermined value representing a maximum data size of an uplink acknowledgement packet of the uplink packets.

16. The method according to claim 15, wherein the uplink threshold is determined further according to a first predetermined value representing an average data size of the downlink packets which are response to the uplink packets.

17. The method according to claim 15, wherein, the gateway limits the transmission rate of the uplink packets within the uplink threshold by limiting a flow per unit time of the uplink packets within a packet number.

* * * * *

UNITED STATES PATENT AND TRADEMARK OFFICE
CERTIFICATE OF CORRECTION

PATENT NO.       : 8,773,991 B2                                    Page 1 of 1
APPLICATION NO.  : 13/553000
DATED            : July 8, 2014
INVENTOR(S)      : Zhou et al.

It is certified that error appears in the above-identified patent and that said Letters Patent is hereby corrected as shown below:

On the title page, item (75) inventor, please replace "Zhedng-Bo Zhou" with "Zheng-Bo Zhou"

Signed and Sealed this
Ninth Day of September, 2014

Michelle K. Lee
*Deputy Director of the United States Patent and Trademark Office*